US012790867B2

(12) United States Patent
Becker et al.

(10) Patent No.: US 12,790,867 B2
(45) Date of Patent: Nov. 10, 2026

(54) HINGE ASSEMBLY

(71) Applicant: Caterpillar Inc., Peoria, IL (US)

(72) Inventors: Lloyd Michael Becker, Tucson, AZ (US); Erik E. Knowles, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 18/966,602

(22) Filed: Dec. 3, 2024

(65) Prior Publication Data

US 2026/0152985 A1 Jun. 4, 2026

(51) Int. Cl.
*E05F 1/02* (2006.01)
*E05F 1/06* (2006.01)

(52) U.S. Cl.
CPC ........... *E05F 1/063* (2013.01); *E05Y 2900/40* (2013.01); *E05Y 2900/518* (2013.01)

(58) Field of Classification Search
CPC .. F25D 23/028; F25D 23/04; F25D 2323/024; F25D 11/00; F25D 25/025; E05Y 2900/31; E05Y 2201/638; E05Y 2900/102; E05Y 2900/40; E05Y 2900/518; E05D 3/02; E05D 5/125; E05D 5/14; E05D 7/081; E05D 7/0027; E05F 1/043; E05F 1/1207; E05F 1/063
See application file for complete search history.

(56) References Cited

U.S. PATENT DOCUMENTS

| | | | | | |
|---|---|---|---|---|---|
| D5,304 | S * | 10/1871 | Suedekum | D8/328 | |
| 1,072,364 | A * | 9/1913 | Robert | E05D 7/081 | 16/317 |
| 1,330,647 | A * | 2/1920 | Neal | E05F 1/063 | 16/318 |
| 2,685,102 | A * | 8/1954 | Forkey | E05D 3/02 | 16/284 |
| 7,000,289 | B2 * | 2/2006 | Cedrone | E05F 1/063 | 16/273 |

(Continued)

FOREIGN PATENT DOCUMENTS

| | | | |
|---|---|---|---|
| CN | 2156260 Y | * | 2/1994 |
| CN | 2527665 Y | | 12/2002 |

(Continued)

OTHER PUBLICATIONS

Caterpillar Handrail Assembly Part No. 612-5397, online parts sheet (2 pages, attached), retrieved on Oct. 15, 2024 from https://sis2.cat.com/#/refine?serialNumber=DR6&keyword=5262156.

(Continued)

*Primary Examiner* — Chuck Y Mah

(57) ABSTRACT

A hinge arrangement allowing a gate on a construction machine to move between a closed and an open position is disclosed. The hinge arrangement includes an upper hinge member and a lower hinge member. The hinge members each include a flat segment and an arcuate segment connected to the flat segment. The arcuate segments of each hinge member each have an engagement surface opposite another, and the arcuate segments are each separated into three sections each having an engagement surface which is opposite another surface. Each engagement surface both slopes towards or away from the other surface as well as pitches either inward or outward.

20 Claims, 9 Drawing Sheets

(56) References Cited

U.S. PATENT DOCUMENTS

| | | | | |
|---|---|---|---|---|
| 7,945,996 | B2 * | 5/2011 | Gunderson | E05F 1/063 16/303 |
| 9,926,731 | B2 | 3/2018 | Bacchetti | |
| 10,858,873 | B2 | 12/2020 | Talpe | |
| D1,034,146 | S * | 7/2024 | Cedrone | D8/329 |
| 2003/0009945 | A1 * | 1/2003 | Cheng | E05F 1/063 49/55 |
| 2005/0011046 | A1 * | 1/2005 | Dionysian | E05F 1/063 16/316 |
| 2017/0362869 | A1 | 12/2017 | Ghantous et al. | |
| 2023/0114344 | A1 * | 4/2023 | Li | E05F 1/066 312/405 |
| 2023/0349214 | A1 * | 11/2023 | Marsden | E05D 11/1007 |

FOREIGN PATENT DOCUMENTS

| | | | | |
|---|---|---|---|---|
| CN | 201843424 U | | 5/2011 | |
| CN | 206646950 U | | 11/2017 | |
| CN | 207315091 U | | 5/2018 | |
| CN | 110905320 A | | 3/2020 | |
| CN | 210685684 U | | 6/2020 | |
| CN | 215718051 U | | 2/2022 | |
| CN | 216341554 U | | 4/2022 | |
| EP | 3384116 B1 | | 10/2020 | |
| EP | 4098831 A1 | | 12/2022 | |
| FR | 2694042 A1 | * | 1/1994 | E05F 1/063 |
| GB | 2198473 A | * | 6/1988 | E05F 1/1223 |
| GB | 2289085 A | * | 11/1995 | E05F 1/1223 |
| GB | 2359114 A | * | 8/2001 | E05F 1/063 |

OTHER PUBLICATIONS

Caterpillar Handrail Assembly Part No. 612-5397, CAD drawings (3 pages, attached).

Written Opinion and International Search Report for Int'l. Patent Appln. No. PCT/US2025/055087, mailed Mar. 23, 2026 (13 pgs).

* cited by examiner

HINGE ASSEMBLY

TECHNICAL FIELD

The present disclosure relates generally to a hinge, and more particularly to a hinge with angled engagement surfaces.

BACKGROUND

Hinges are used to connect objects together such that one of the objects can rotate. For example, doors are commonly connected to hinges which allow the doors to open and close. Although many hinges are simply used to provide rotation, some hinges have additional features, such as self-closing capabilities.

A hinge generally supports the entire weight of the rotating object, such as the door. The weight may cause a portion of the hinge to tilt slightly, which may cause hinge wear or make the hinge more difficult to open and close. This may be especially noticeable for self-closing hinges, where the self-closing function is impeded by the increased resistance of a misalignment.

U.S. Pat. No. 9,926,731B2 describes a hinge having a self-closing feature. The hinge is made up of two sides connected in line with one another at a joint, each having a mounting surface which may be coupled to a static structure and/or a rotatable structure. The self-closing feature is nestled within the joint and includes an angled slot with a first and second end, a pin, and a spring. The pin fits within the angled slot and can slide along the slot until it hits one of the ends, at which point the rotation of the hinge stops in that direction. The spring exerts a force on the slot, such that it presses against the pin and attempts to rotate towards one of the ends.

However, the self-closing features of the hinge disclosed in the '731 patent present a complicated design with a great number of parts. Further, and overall, the hinge of the '731 patent appears to be a design that would be susceptible to uneven loading on one or both of the two sides, leading to pressure points and impeding the easy rotation of the hinge.

SUMMARY

In an aspect of the present disclosure, a hinge arrangement is provided for allowing a gate on a construction machine to move between a closed and open position. The hinge arrangement includes an upper hinge member and a lower hinge member. The upper hinge member has an upper flat segment which has a first upper surface and a first lower surface opposite one another, as well as a first front surface and first back surface opposite one another. The upper flat segment includes a first upper flat section extending from an end of the upper flat member to a second upper flat section, which extends to a first upper arcuate section. The first lower surface of the second upper flat section slopes towards the first upper surface. The upper hinge member also has an upper arcuate segment which has a first top surface and a first engagement surface opposite one another, as well as a first inner surface and a first outer surface opposite one another. The upper arcuate segment has a first upper arcuate section extending from the second upper flat section to a second upper arcuate section, the first engagement surface of the first upper arcuate section sloping towards the first upper surface and pitching towards the first inner surface. The upper arcuate section also has a second upper arcuate section extending from the first upper arcuate section to a third upper arcuate section, the first engagement surface of the second upper arcuate section sloping away from the first upper surface and pitching towards the first inner surface. Finally, the upper arcuate section has a third upper arcuate section extending from the second upper arcuate section to an end of the upper arcuate member, the first engagement surface of the third upper arcuate section sloping towards the first upper surface and pitching towards the first inner surface. The lower hinge member has a lower flat segment which has a second upper surface and a second lower surface opposite one another, as well as a second front surface and a second back surface opposite one another. The lower flat segment includes a first lower flat section extending from an end of the lower flat member to a second lower flat section, which extends to a to a first lower arcuate section. The second upper surface of the second lower flat section slopes towards the second lower surface. The lower hinge member also has a lower arcuate segment which has a second engagement surface and a second bottom surface opposite one another, as well as a second inner surface and a second outer surface opposite one another. The lower arcuate segment has a first lower arcuate section extending from the second lower flat section to a section lower arcuate section, the second engagement surface of the first lower arcuate section sloping towards the second lower surface and pitching towards the second outer surface. The lower arcuate segment also has a second lower arcuate section extending from the first lower arcuate section to a third lower arcuate section, the second engagement surface of the second lower arcuate section sloping away from the second lower surface and pitching towards the second outer surface. Finally, the lower arcuate segment a third lower arcuate section extending from the second lower arcuate section to an end of the lower arcuate member, the second engagement surface of the third lower arcuate section sloping towards the second lower surface and pitching towards the second outer surface.

In another aspect of the present disclosure, there is a gate assembly for a construction machine that includes a support member, a gate, and a hinge assembly connecting the support member to the gate. The hinge assembly includes an upper hinge member and a lower hinge member. The upper hinge member includes an upper flat segment which has a first end connected to one of the support member or gate, as well as a first upper surface and a first lower surface opposite one another and a first front surface and a first back surface opposite one another. The first upper flat segment includes a first upper flat section extending from an end of the upper flat member to a second upper flat section, which extends to a first upper arcuate section, the first lower surface of the second upper flat section sloping towards the first upper surface. The upper hinge member also has an upper arcuate segment connected to the upper flat section, which has a first top surface and a first engagement surface opposite one another as well as a first inner surface and a first outer surface opposite one another. The first upper arcuate segment has a first upper arcuate section extending from the second upper flat section to a second upper arcuate section, the first engagement surface of the first upper arcuate section sloping towards the first upper surface and pitching towards the first inner surface. The upper arcuate segment also has a second upper arcuate section extending from the first upper arcuate section to a third upper arcuate section, the first engagement surface of the second upper arcuate section sloping away from the first upper surface and pitching towards the first inner surface. Finally, the upper arcuate segment has a third upper arcuate section extending from the second upper arcuate section to an end of the upper arcuate member, the first engagement surface of the third upper arcuate section sloping towards the first upper surface and pitching towards the first inner surface. The lower hinge member has a lower flat segment which has a second end connected to the other of the support member or gate. The lower hinge member has a second upper surface and a second lower surface opposite one another, and a second front surface and a second back surface opposite one another. The lower flat segment has a first lower flat section extending from an end of the lower flat member to a second lower flat section, which extends to a first lower arcuate section, the second upper surface of the second lower flat section sloping towards the second lower surface. The lower arcuate segment has a second engagement surface and a second bottom surface opposite one another, as well as a second inner surface and a second outer surface opposite one another. The lower arcuate segment has a first lower arcuate section extending from the second lower flat section to a second lower arcuate section, the second engagement surface of the first lower arcuate section sloping towards the second lower surface and pitching towards the second outer surface. The second arcuate segment also has a second lower arcuate section extending from the first lower arcuate section to a third lower arcuate section, the second engagement surface of the second lower arcuate section sloping away from the second lower surface and pitching towards the second outer surface. Finally, the second arcuate segment has a third lower arcuate section extending from the second lower arcuate section to an end of the lower arcuate member, the second engagement surface of the third lower arcuate section sloping towards the second lower surface and pitching towards the second outer surface.

In yet another aspect of the present disclosure, there is a hinge arrangement including an upper hinge member and a lower hinge member. The upper hinge member includes an upper flat segment which has a first upper surface and a first lower surface opposite one another, as well as a first front surface and a first back surface opposite one another. The upper flat segment includes a first upper flat section extending from an end of the upper flat member to a second upper flat section, which extends to a first upper arcuate section, the first lower surface of the second upper flat section sloping towards the first upper surface. The upper hinge member also includes an upper arcuate segment connected to the upper flat section, the upper arcuate segment including a first top surface and a first engagement surface opposite one another, as well as a first inner surface and a first outer surface opposite one another. The upper arcuate segment includes a first upper arcuate section extending from the second upper flat section to a second upper arcuate section, the first engagement surface of the first upper arcuate section sloping towards the first upper surface at an angle between 38-42 degrees, and pitching towards the inner surface at an angle between 28-32 degrees. The upper arcuate segment further includes a second upper arcuate section extending from the first upper arcuate section to a third upper arcuate section, the first engagement surface of the second upper arcuate section sloping away from the first upper surface at an angle between 38-42 degrees and pitching towards the inner surface at an angle between 28-32 degrees. Finally, the first arcuate segment includes a third upper arcuate section extending from the second upper arcuate section to an end of the upper arcuate member, the first bottom surface of the third upper arcuate section sloping towards the first upper surface at an angle between 38-42 degrees and pitching towards the inner surface at an angle between 28-32 degrees. The lower hinge member includes a lower flat segment which has a second upper surface and a second lower surface opposite one another, the second upper surface configured to engage the first lower surface, and a second front surface and a second back surface opposite one another. The lower flat segment has a first lower flat section extending from an end of the lower flat member to a second lower flat section, which extends to a third lower flat section, the second upper surface of the second lower flat section sloping towards the second lower surface. The lower flat segment further has a third lower flat section extending from the second lower flat section to a first lower arcuate section, the second upper surface of the third flat section sloping away from the second lower surface. The lower hinge member also includes a lower arcuate segment connected to the lower flat member having a second engagement surface and a second bottom surface opposite one another, and a second inner surface and a second outer surface opposite one another. The lower arcuate segment has a first lower arcuate section extending from the third lower flat section to a second lower arcuate section, the second engagement surface of the first lower arcuate section sloping towards the second lower surface at an angle between 38-42 degrees and pitching towards the second outer surface at an angle between 28-32 degrees. The lower arcuate segment also has a second lower arcuate section extending from the first lower arcuate section to a third lower arcuate section, the second engagement surface of the second lower arcuate section sloping away from the second lower surface at an angle between 38-42 degrees and pitching towards the second outer surface at an angle between 28-32 degrees. Finally, the lower arcuate segment has a third lower arcuate section extending from the second lower arcuate section to an end of the lower arcuate member, the second engagement surface of the third lower arcuate section sloping towards the second lower surface at an angle between 38-42 degrees and pitching towards the second outer surface at an angle between 28-32 degrees. When the intersection of the first upper arcuate section and the second upper arcuate section is in contact with the intersection of the first lower arcuate section and the second lower arcuate section, the hinge member is in a closed position, and when the intersection of the second upper arcuate section and the third upper arcuate section is in contact with the intersection of the first lower arcuate section and the second lower arcuate section, the hinge member is in a fully open position. While moving between the closed position and the fully open position, either the first engagement surface of the first and third arcuate sections each engage the second up engagement per surface of the first and third arcuate sections, or the first engagement surface of the second upper arcuate section engages the second engagement surface of the second lower arcuate section, the other sections separating from one another.

Other features and aspects of this disclosure will be apparent from the following description and the accompanying drawings.

DETAILED DESCRIPTION

Figure 1:
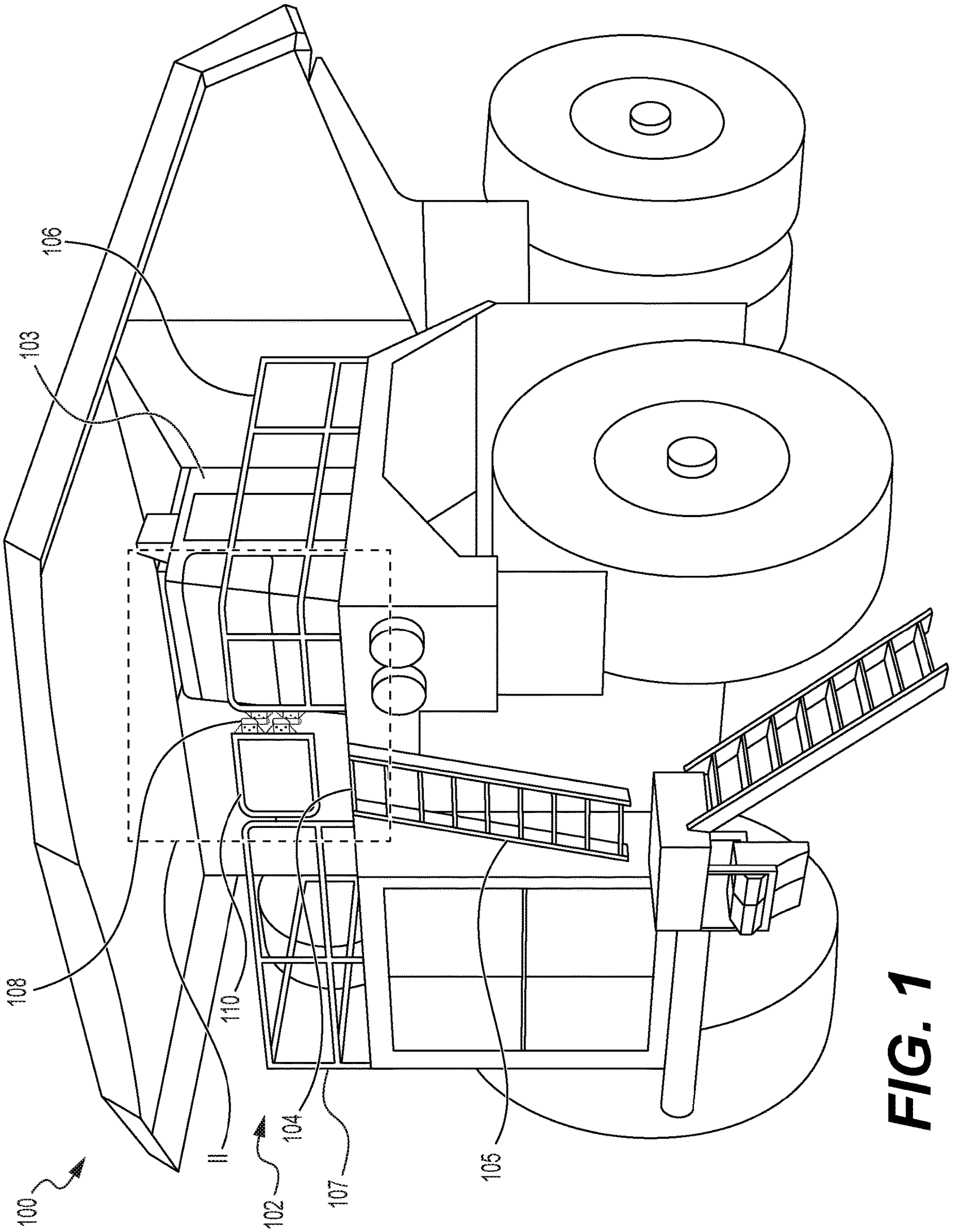
FIG. 1 is a perspective view of a mining truck having an operator area.

FIG. 1 shows a mining truck 100 having an operator area 102. The operator area 102 generally includes a cab 103, and a human operator might sit within the cab 103 while controlling or otherwise driving and operating the mining truck 100. Further, the operator area 102 includes a walkway 104 and ladders 105 which are external to the cab 103, the walkway 104 separated from the worksite by a first rail 106, a second rail 107, and a gate 110. The gate 110 includes a pair of hinge assemblies 108, which the operator may use to rotate the gate 110 and create a temporary opening between the rails, 106 and 107, to enter and exit the walkway 104.

The walkway 104 defines a walkable area on the mining truck 100 and is shown wrapping around an upper portion of the mining truck 100. The rails, 106 and 107, are connected to the outer edges of the walkway 104 and extend upwards therefrom. The operator area 102 shown includes two rails, 106 and 107, positioned such that there is space between the rails, 106 and 107, for the gate 110.

The hinge assemblies 108 are each an arrangement of components and are connected between the first rail 106 and the gate 110. The gate 110 is positioned between the rails, 106 and 107, and is connected to the hinge assemblies 108, which enable the gate 110 to rotate relative to the first rail 106. Although shown as a pair of hinge assemblies 108, there may be a single hinge assembly 108 or additional hinge assemblies 108 connecting either of the rails, 106 or 107, to the gate 110. Further, although the operator area 102 is illustrated on the mining truck 100, it is understood that the operator area 102, or portions thereof, may be on any number of construction machines.

Figure 2:
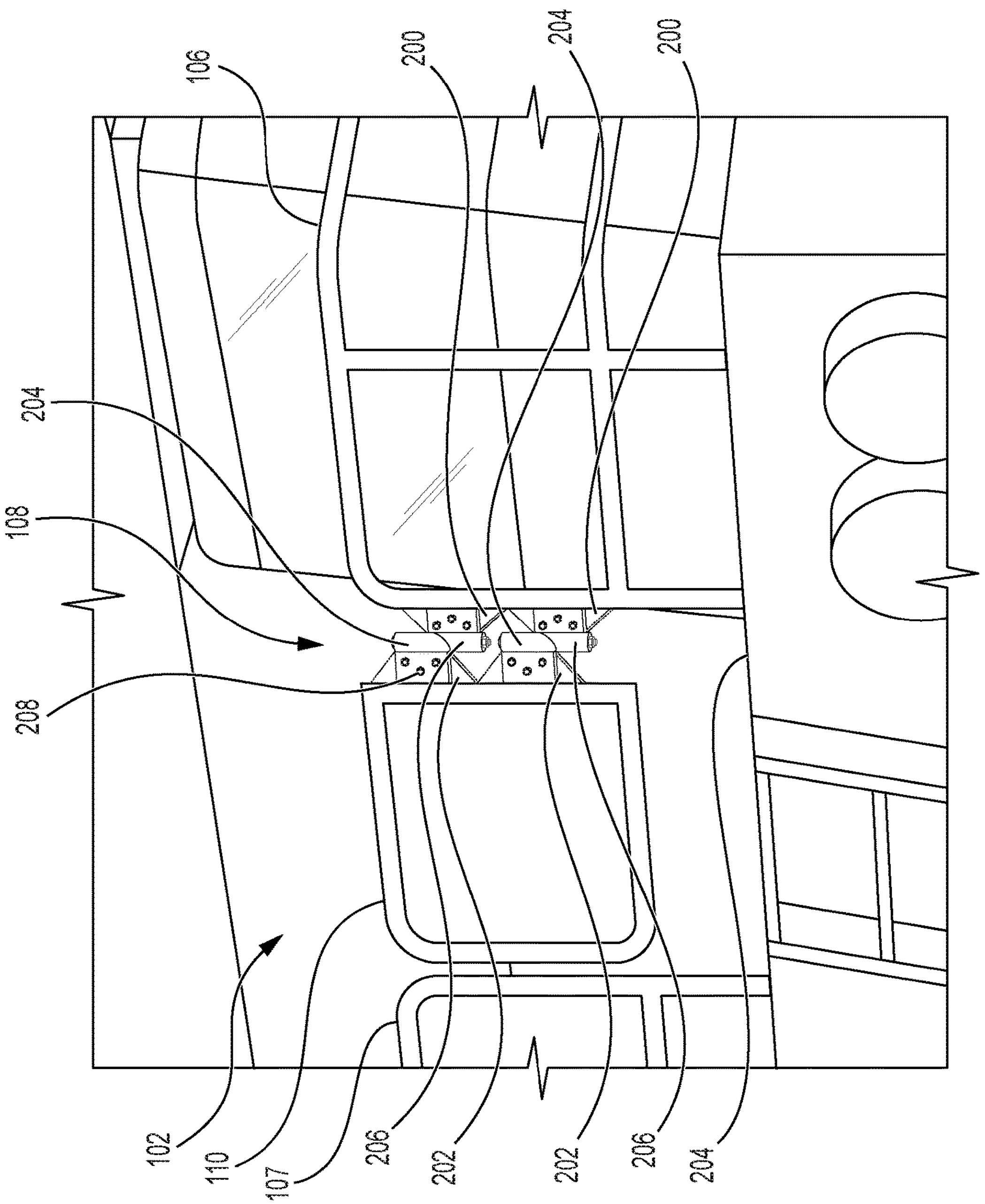
FIG. 2 is a perspective view showing details of the operator area of FIG. 1, including a gate and hinge assembly.

FIG. 2 shows a portion of the operator area 102, noted in the dashed line box labeled "II" in FIG. 1. As shown, the first rail 106 is connected to the hinge assemblies 108 and is associated with a pair of rail brackets 200. The gate 110 is also connected to the hinge assemblies 108 and is associated with a pair of gate brackets 202. The hinge assemblies 108 are shown to each include an upper hinge member 204 and a lower hinge member 206. A plurality of connectors 208 connect the hinge assemblies 108 to the rail brackets 200 and gate brackets 202.

The rail brackets 200 are shown coupled to one of the rails 106, such that the rail brackets 200 do not move with respect to that support 106. The rail brackets 200 provide a first mounting location for one side of the hinge assemblies 108. Similarly, the gate brackets 202 are shown coupled to the gate 110, such that the gate brackets 202 do not move with respect to the gate 110. The gate brackets 202 provide a second mounting location for the other side of the hinge assemblies 108.

Each upper hinge member 204 is shown rigidly connected to one of the gate brackets 202, and each lower hinge member 206 is shown rigidly connected to one of the rail brackets 200. The upper hinge member 204 and lower hinge member 206 are also rotatably connected to one another. The structure and relationship of the upper hinge member 204 and the lower hinge member 206 allow them to rotate between a closed and fully opened position in a clockwise and counterclockwise direction, as shown and described later with reference to FIGS. 6-9.

Alternatively, the first rail 106 may not have any rail brackets 200, and/or the gate 110 may not have any gate brackets 202. In such a case, the upper hinge member 204 and the lower hinge member 206 may be directly connected to the first rail 106 and/or the gate 110. Such connections may be welded, adhered, friction fit, slotted, and the like such that there may not be any connectors 208 connecting the hinge assemblies 108 to the first rail 106 and/or the gate 110. Further, the first rail 106 may have a single rail bracket 200 and/or the gate 110 may have a single gate bracket 202. In such a case, each of the upper hinge members 204 and/or lower hinge members 206 may be connected to their respective single bracket.

Figure 3:
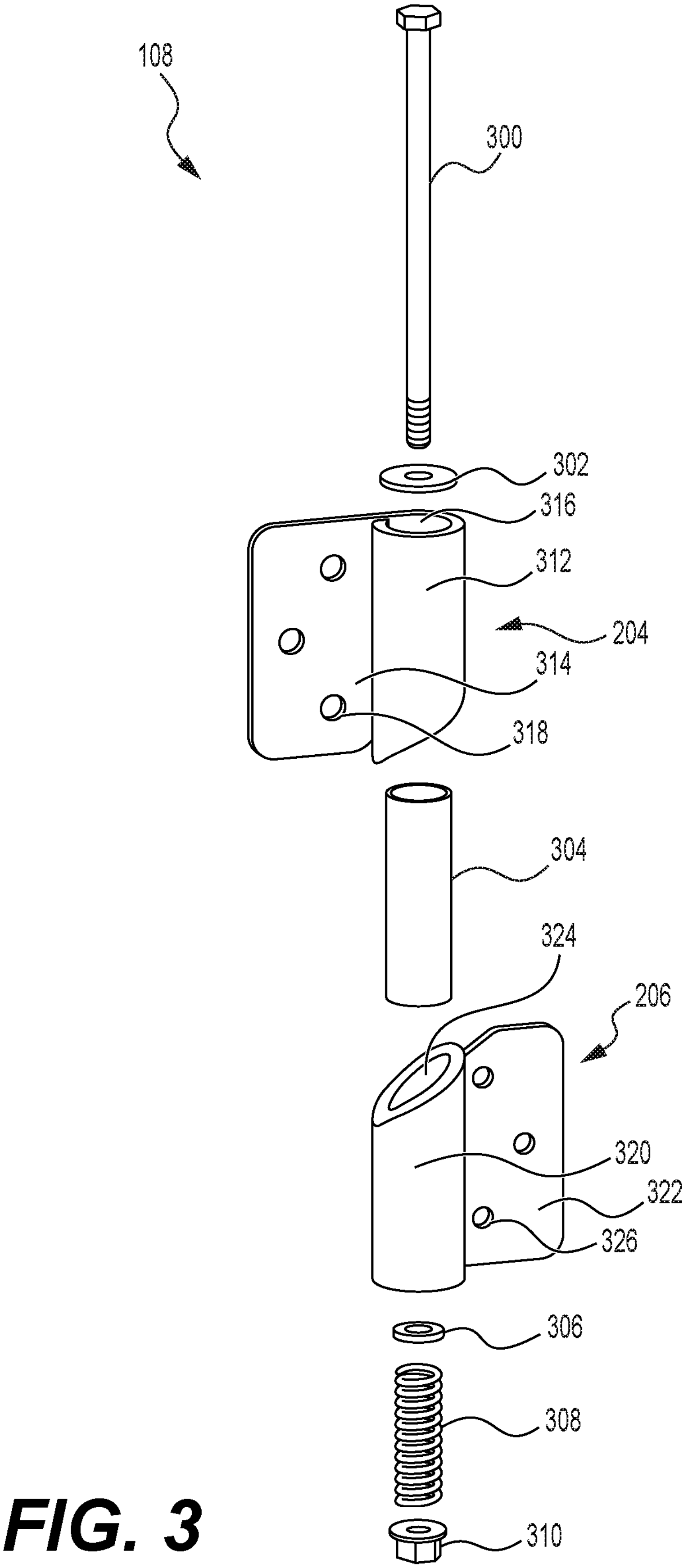
FIG. 3 is an exploded view of a hinge assembly, such as shown in FIG. 2, and which generally includes an upper hinge member and a lower hinge member.

Turning to FIG. 3, one of the hinge assemblies 108 is shown, including a fastener 300, fastener support 302, upper hinge member 204, sleeve 304, lower hinge member 206, spring support 306, spring 308, and coupler 310.

The fastener 300 is shown as a bolt which extends through the rest of the components of the hinge assembly 108. The fastener 300 abuts the fastener support 302 and connects to the coupler 310, such that when connected, the fastener 300 and coupler 310 hold the rest of each hinge assembly 108 together. Fastener support 302 is shown as a washer which mates with the upper hinge member 204 and allows a portion of the fastener 300 to pass through.

The upper hinge member 204 includes an upper barrel segment 312 connected to an upper plate segment 314. The upper barrel segment 312 defines an upper channel 316 which accepts the fastener 300 and sleeve 304. The upper plate segment 314 includes a plurality of upper segment holes 318 configured to accept the connectors 208 shown in FIG. 2.

The sleeve 304 is a tube that mates to the inside of both the upper channel 316 and a lower channel 324 such that movement between the upper hinge member 204 and lower hinge member 206 is limited to rotation and movement in a vertical direction with respect to one another. The sleeve 304 may mate with the spring support 306 and/or the fastener support 302.

The lower hinge member 206 includes a lower barrel segment 320 connected to a lower plate segment 322. The lower barrel segment 320 is shown as a rolled plate defining the lower channel 324 which accepts the fastener 300, the sleeve 304, and the spring support 308. The lower plate segment 322 includes a plurality of lower segment holes 326 configured to accept the connectors 208 shown in FIG. 2.

The spring support 306 is a washer that sits within the lower channel 324 of the lower barrel segment 320. The spring support 306 is situated within the sleeve 304 within the lower channel 324 such that it does not move in an upward direction, providing a surface for the top of the spring 308 to press against. The spring 308 provides a biasing force which pushes the upper hinge member 204 downward against the lower hinge member 206. However, due to its compressibility, the spring 308 may also compress and allow the upper hinge member 204 to move upwards with respect to the lower hinge member 206 when acted on by an outside rotational force.

The coupler 310 attaches to the fastener 300, and together they hold each hinge assembly 108 together. The coupler 310 also provides a surface which mates with the bottom of the spring 308 and may move vertically in relation to the spring support 306 to compress and decompress the spring 308. The coupler 310 is sized such that it fits within the lower channel 324, such that it may move vertically when the fastener 300 is moved vertically by rotating the upper hinge member 204.

Although fastener support 302 and spring support 306 are each shown as a separate component of the hinge assembly 108, the fastener support 302 may be connected to the upper hinge member 204 or integrated therewith, and the spring support 306 may be connected within the lower hinge member 206 or integrated therewith. Similarly, although the sleeve 304 is shown as a separate component of the hinge assembly 108, the sleeve 304 may be integrated with the upper barrel segment 312 or the lower barrel segment 320.

Further, one or more portions of the hinge assemblies 108 may be formed with a variety of machining processes. Such processes include casting, extrusion, deformation, cutting, and the like and combinations thereof. For example, in a casting example, the upper hinge member 204 may be formed with the fastener support 302, and the lower hinge member 206 may be formed with the sleeve 304 and the spring support 306. In another example, the upper barrel segment 312 and the upper plate segment 314 may be separate components and welded together and/or the lower barrel segment 320 and lower plate segment 322 may be separate components and welded together.

Figure 6:
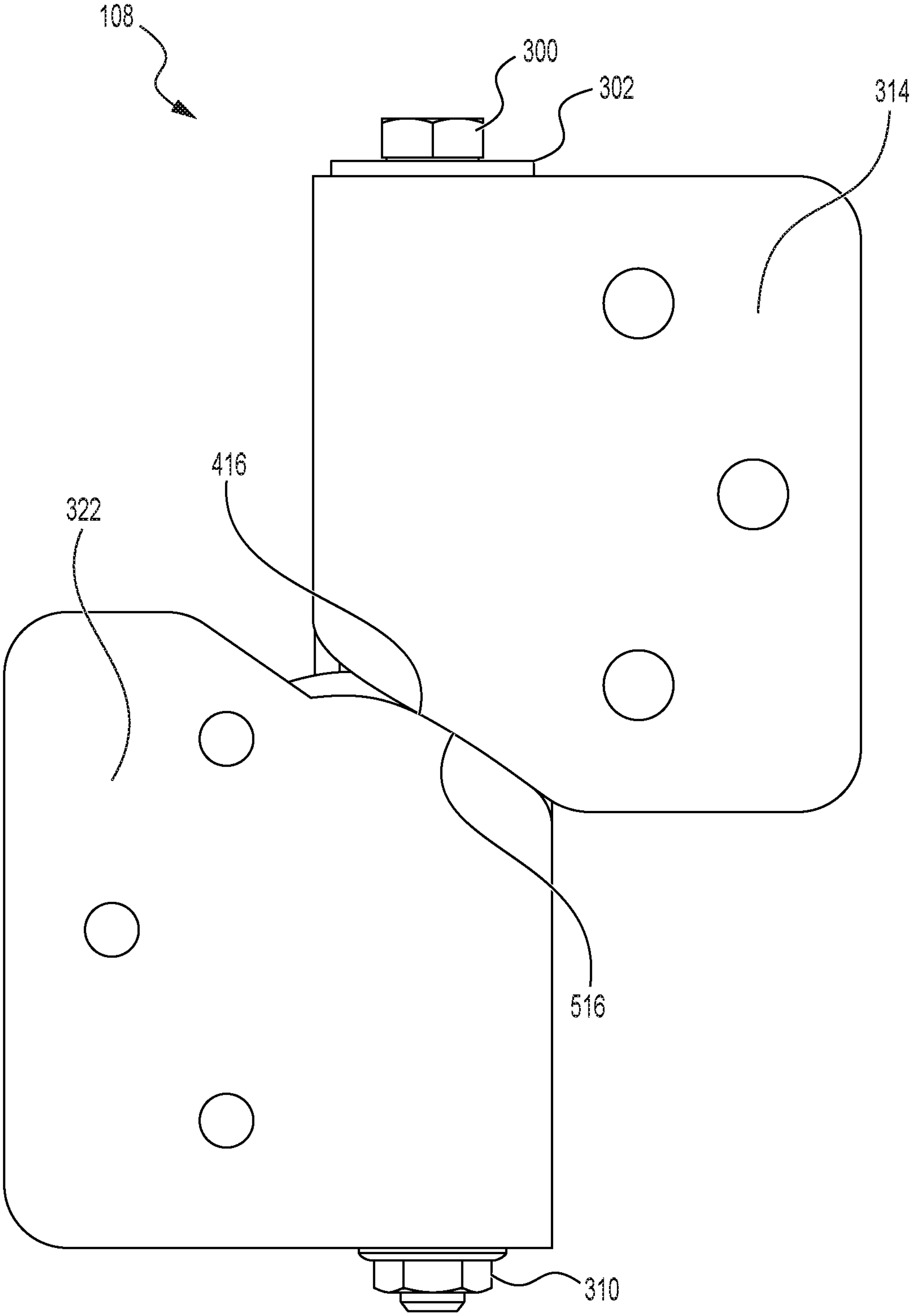
FIG. 6 is a side view of a hinge assembly in a closed position.
Figure 7:
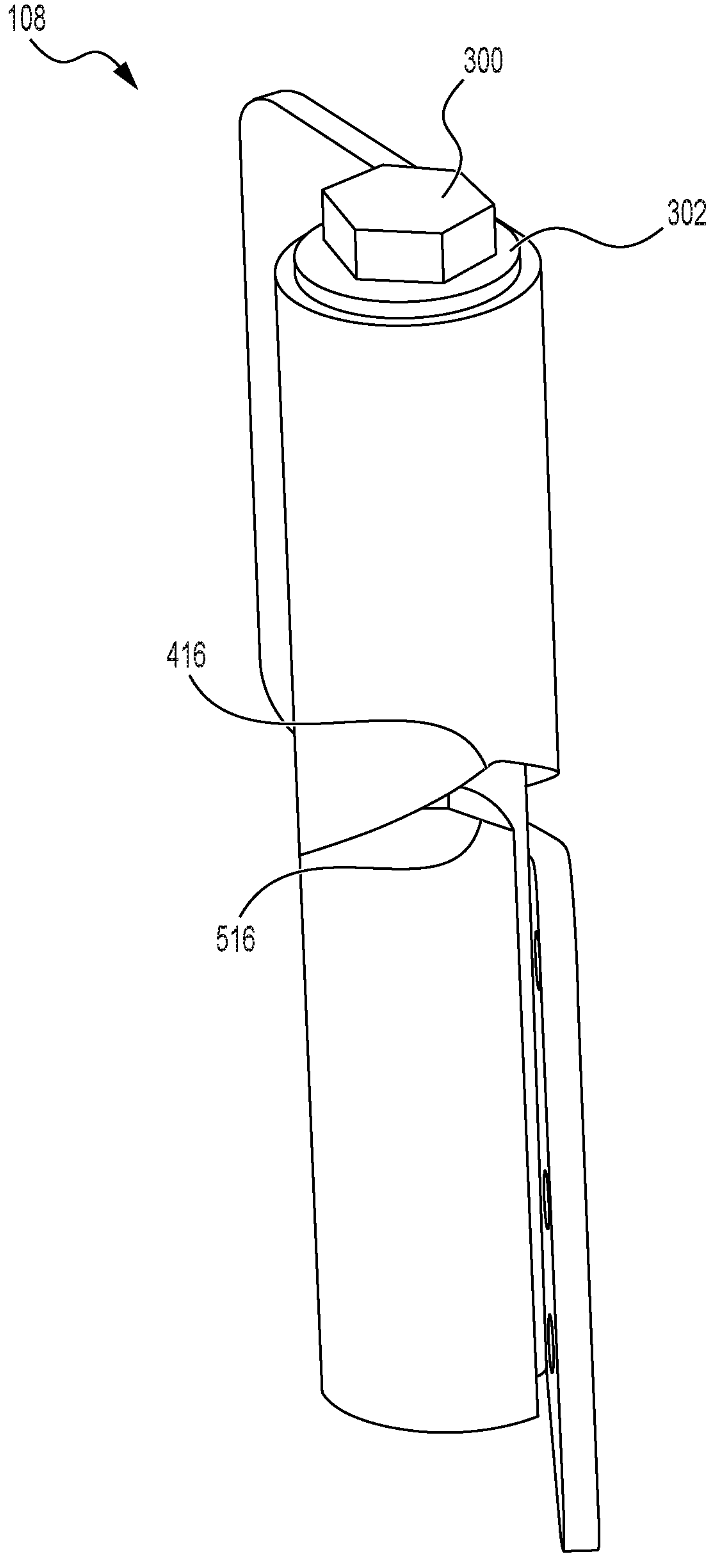
FIG. 7 is a perspective view of a hinge assembly slightly open in a first direction.
Figure 8:
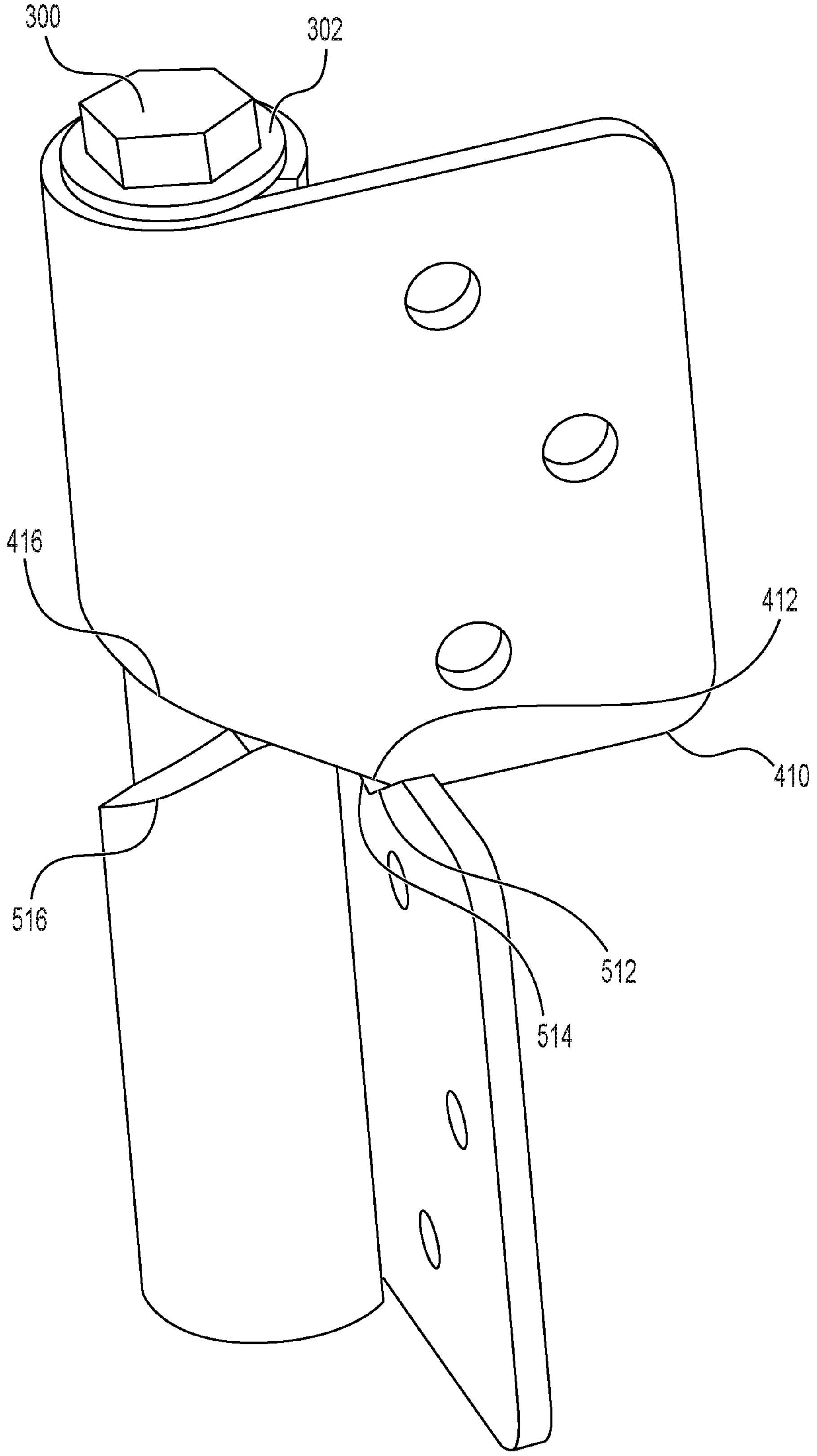
FIG. 8 is a perspective view of a hinge assembly half open in a second direction.

In operation, further shown with reference to FIGS. 6-8, when the fastener 300 is connected to the coupler 310, the spring 308 is compressed between the spring support 306 and the coupler 310. The fastener support 302 prevents the fastener 300 from moving in a downward direction with respect to the upper hinge member 204, while the spring support 306 prevents the spring 308 from moving in an upward direction with respect to the lower hinge member 206. Accordingly, rotation of the upper hinge member 204 around the lower hinge member 206 draws the coupler 310 towards the spring support 306 and further compresses the spring 308.

Figure 4:
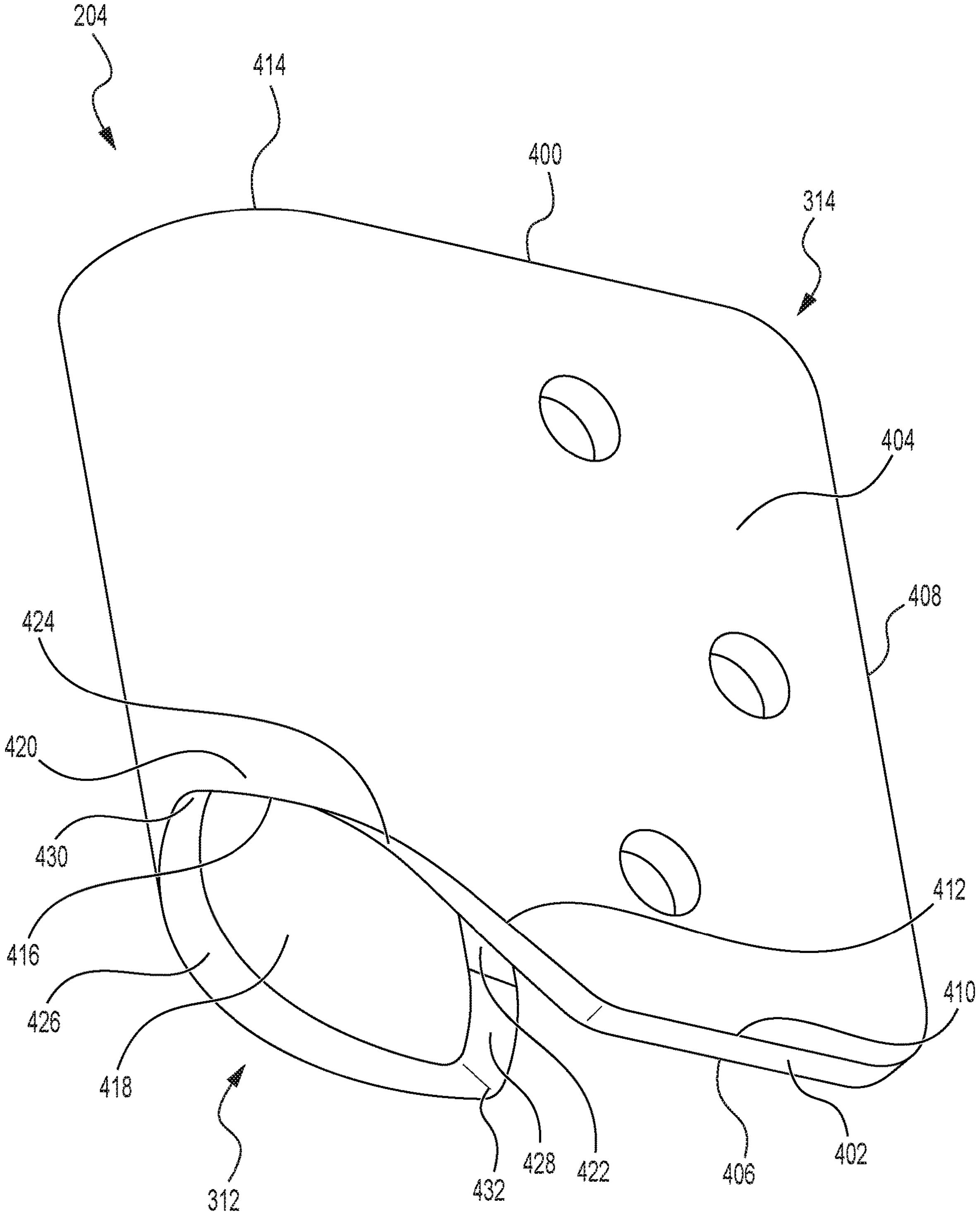
FIG. 4 is a perspective view of the upper hinge member of FIG. 3.

FIG. 4 shows the upper hinge member 204, including the upper plate segment 314 and the upper barrel segment 312. The upper plate segment 314 has a first upper surface 400, a first lower surface 402, a first front surface 404, a first back surface 406, a first flat end surface 408, a first upper flat section 410, and a second upper flat section 412.

The first upper surface 400 and first lower surface 402 are opposite one another and define a top and bottom of the upper plate segment 314. Similarly, the first front surface 404 and first back surface 406 are opposite one another and define a front and a back of the upper plate segment 314. The first flat end surface 408 defines an end of the upper plate segment 314 and is opposite the connection between the upper plate segment 314 and the upper barrel segment 312.

The first upper flat section 410 extends from the first flat end surface 408 of the upper plate segment 314 to the second upper flat section 412. The first lower surface 402 of the first upper flat section 410 is a flat surface. Accordingly, the first lower surface 402 does not slope, or angle upwards or downwards while moving in line with the section. Neither does the first lower surface pitch, or angle upwards or downwards while traveling perpendicular across the section.

The second upper flat section 412 extends from the first upper flat section 410 to the upper barrel segment 312. The first lower surface 402 of the second upper flat section 412 slopes toward the first upper surface 400, however does not pitch in any direction. As shown, the first lower surface 402 of the second upper flat section 412 slopes upward at an angle of about 40 degrees.

The upper barrel segment 312 has a first top surface 414, a first engagement surface 416, a first inner surface 418, a first outer surface 420, a first arcuate end surface 422, a first upper arcuate section 424, a second upper arcuate section 426, and a third upper arcuate section 428.

The first top surface 414 and first engagement surface 416 are opposite one another and define a top and bottom of the upper barrel segment 312. Similarly, the first inner surface 418 and first outer surface 420 are opposite one another and define an inside and an outside of the upper barrel segment 312. The first arcuate end surface 422 defines an end of the upper barrel segment 312.

The first upper arcuate section 424 extends from the second upper flat section 412 to the second upper arcuate section 426. The first engagement surface 416 of the first upper arcuate section 424 slopes towards the first top surface 414, and pitches towards the first inner surface 418. For example, with such a slope, the line at the interface between the first engagement surface 416 and the second upper flat section 412 is further away from the top surface 414 as compared to the line at the interface between the first engagement surface 416 and the second upper arcuate section 426. The first engagement surface 416 of the first upper arcuate section 424 slopes upward at an angle of about 40 degrees, and pitches inward at an angle of about 30 degrees. The point where the first upper arcuate section 424 and the second upper arcuate section 426 connect defines a first upper intersection 430. The first upper intersection 430 is the point of the first engagement surface 416 nearest to the first top surface 414.

The second upper arcuate section 426 extends from the first upper arcuate section 424 to the third upper arcuate section 428. The first engagement surface 416 of the second upper arcuate section 426 slopes away from the first top surface 414, and pitches towards the first inner surface 418. For example, with such a pitch, the line at the interface between the first engagement surface 416 and the first outer surface 420 is further away from the first top surface 414 as compared to the line at the interface between the first engagement surface 416 and the first inner surface 418. As shown, the first engagement surface 416 of the second upper arcuate section 426 slopes downward at an angle of about 40 degrees, and pitches inward at an angle of about 30 degrees. The point where the second upper arcuate section 426 and the third upper arcuate section 428 connect defines a second upper intersection 432. The second upper intersection 432 is the point of the first engagement surface 416 furthest from the first top surface 414.

The third upper arcuate section 428 extends from the second upper arcuate section 426 to the first arcuate end surface 422. The first engagement surface 416 of the third upper arcuate section 428 slopes towards the first top surface 414, and pitches towards the first inner surface 418. As shown, the first engagement surface 416 of the third upper arcuate section 428 slopes upwards at an angle of about 40 degrees, and pitches inwards at an angle of about 30 degrees.

The first engagement surface 416 and/or other portions of the upper hinge member 204, may undergo a heat treatment or other hardening process to increase the hardness and/or strength of the material. For example, the first engagement surface 416 may undergo nitriding, a ferric nitrocarburizing process, HVAF thermal coating, or other heat treatments to create a case-hardened surface. Further, the various components of the hinge assemblies 108 may be made of any number of materials, including but not limited to metals and plastics. For example, the hinge assemblies 108 may be made of stainless steel to promote corrosion resistance.

Although the first engagement surface 416 is disclosed as sloping upwards and downwards at an angle of about 40 degrees and pitching inwards at an angle of about 30 degrees, the first engagement surface 416 may slope upwards and downwards at other angles between 20 and 70 degrees and may pitch inwards or outwards at other angles between 20 and 45 degrees. For example, the slope may be an angle between 30 and 50 degrees, and/or between 38 and 42 degrees, and/or the pitch may be an angle between 24 and 36 degrees, and/or between 28 and 32 degrees.

Figure 5:
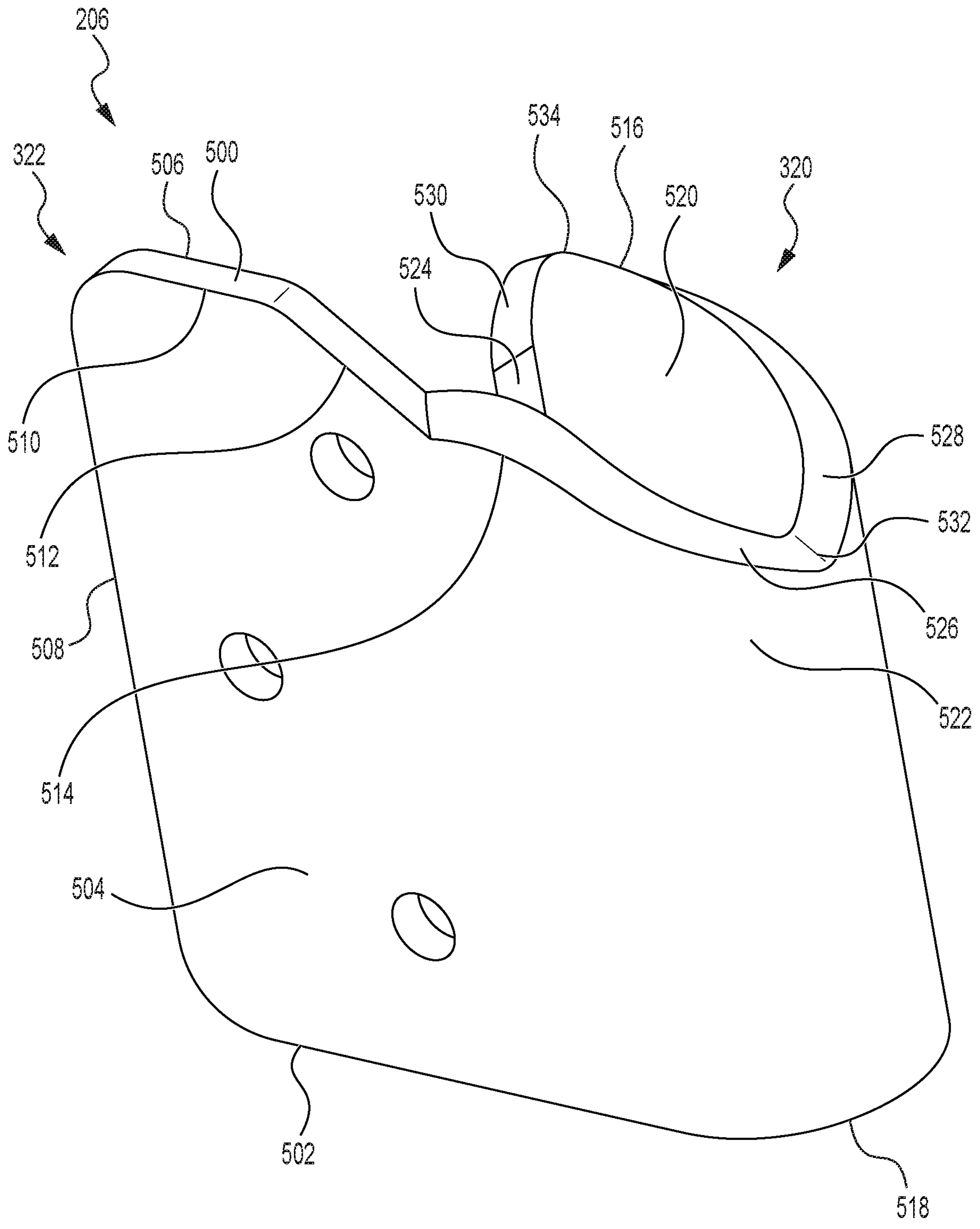
FIG. 5 is a perspective view of the lower hinge member of FIG. 3.

FIG. 5 shows the lower hinge member 206, including the lower plate segment 322 and the lower barrel segment 320. The lower plate segment 322 has a second upper surface 500, a second lower surface 502, a second front surface 504, a second back surface 506, a second flat end surface 508, a first lower flat section 510, a second lower flat section 512, and a third lower flat section 514.

The second upper surface 500 and second lower surface 502 are opposite one another and define a top and bottom of the lower plate segment 322. Similarly, the second front surface 504 and second back surface 506 are opposite one another and define a front and a back of the lower plate segment 322. The second flat end surface 508 defines an end of the lower plate segment 322 and is opposite the connection between the lower plate segment 322 and the lower barrel segment 320.

The first lower flat section 510 extends from the second flat end surface 508 of the lower plate segment 322 to the second lower flat section 512. The second upper surface 500 of the first lower flat section 510 is a flat surface and does not slope or pitch in any direction.

The second lower flat section 512 extends from the first lower flat section 510 to the third lower flat section 514. The second upper surface 500 of the second lower flat section 512 slopes towards the second lower surface 502, however does not pitch in any direction. As shown, the second upper surface 500 of the second lower flat section 512 slopes down at an angle of about 40 degrees.

The third lower flat section 514 extends from the second lower flat section 510 to the lower barrel segment 320. The second upper surface 500 of the third lower flat section 514 does not slope in any direction, however pitches towards the second front surface 504. As shown, the second upper surface 500 of the third lower flat section 514 pitches frontward at an angle of about 30 degrees.

The lower barrel segment 320 has a second engagement surface 516, a second bottom surface 518, a second inner surface 520, a second outer surface 522, a second arcuate end surface 524, a first lower arcuate section 526, a second lower arcuate section 528, and a third lower arcuate section 530.

The second engagement surface 516 and the second bottom surface 518 are opposite one another and define a top and bottom of the lower barrel segment 320. Similarly, the second inner surface 520 and second outer surface 522 are opposite one another and define an inside and an outside of the lower barrel segment 320. The second arcuate end surface 524 defines an end of the lower barrel segment 320.

The first lower arcuate section 526 extends from the third lower flat section 514 to the second lower arcuate section 528. The second engagement surface 516 of the first lower arcuate section 526 slopes towards the second bottom surface 518, and pitches towards the second outer surface 522. As shown, the second engagement surface 516 of the first lower arcuate section 526 slopes downward at an angle of about 40 degrees, and pitches outward at an angle of about 30 degrees. The point where the first lower arcuate section 526 and the second lower arcuate section 528 connect defines a first lower intersection 532. The first lower intersection 532 is the lowest point of the second engagement surface 516.

The second lower arcuate section 528 extends from the first lower arcuate section 526 to the third lower arcuate section 530. The second engagement surface 516 of the second lower arcuate section 528 slopes away from the second bottom surface 518, and pitches towards the second outer surface 522. As shown, the second engagement surface 516 of the second upper arcuate section 528 slopes upward at an angle of about 40 degrees, and pitches outwards at an angle of about 30 degrees. The point where the second lower arcuate section 528 and the third lower arcuate section 530 connect defines a second lower intersection 534. The second lower intersection 534 is the highest point of the second engagement surface 516.

The third lower arcuate section 530 extends from the second lower arcuate section 528 to the second arcuate end surface 524. The second engagement surface 516 of the third lower arcuate section 530 slopes towards the second bottom surface 518, and pitches towards the second outer surface 520. As shown, the second engagement surface 516 of the third lower arcuate section 530 slopes downwards at an angle of about 40 degrees, and pitches outwards at an angle of about 30 degrees.

The second engagement surface 516 and/or other portions of the lower hinge member 206, may undergo a heat treatment or other hardening process to increase the hardness and/or strength of the material. For example, the second engagement surface 516 may undergo nitriding, a ferric nitrocarburizing process, HVAF thermal coating, or other heat treatments to create a case-hardened surface.

Although the second engagement surface 516 is disclosed as sloping upwards and downwards at an angle of about 40 degrees, and pitching outwards at an angle of about 30 degrees, the second engagement surface 516 may slope upwards and downwards at any angle between 20 and 70 degrees and may pitch inwards or outwards at any angle between 20 and 45 degrees. For example, the slope may be an angle between 30 and 50 degrees, and/or between 38 and 42 degrees, and/or the pitch may be an angle between 24 and 36 degrees, and/or between 28 and 32 degrees.

Further, the surface of the second engagement surface 516 is configured to mate with the surface of the first engagement surface 416 such that the angles upwards and downwards are complementary, and wherein the angles inwards and outwards are complementary. Additionally, although the first engagement surface 416 is shown pitching inwards and the second engagement surface 516 is shown pitching outwards, the engagement surfaces, 416 and 516, may pitch in either or both directions. Further still, the first lower surface 402 and/or second upper surface 500 may pitch and/or slope in any number of directions. In an example, one or more portions of the first lower surface 402 and/or second upper surface 500 may be a transitional section which slopes and/or angles to match the corresponding engagement surface.

FIGS. 6-9 show one of the hinge assemblies 108 in various positions. FIG. 6 shows the hinge assembly 108 in a closed position. While in the closed position, the upper plate segment 314 and lower plate segment 322 are in line with one another, with the plates, 314 and 322, facing in opposite directions. The engagement surfaces, 416 and 516, have maximum engagement with one another. Although shown as in line with one another, the plates, 314 and 322, may be mounted in any position on their corresponding barrel, 312 and 320, such that the plates may be in any orientation relative to one another at any of the positions.

Further, while in the closed position, multiple intersections are engaged with one another, and multiple surfaces are engaged with one another. For the intersections, the first upper intersection 430 is in contact with the second lower intersection 534, and the second upper intersection 432 is in contact with the first lower intersection 532. For the surfaces, the first engagement surface 416 of the first upper arcuate section 424 engages the second engagement surface 516 of the first and third lower arcuate sections, 526 and 530. Additionally, the first engagement surface 416 of the third arcuate section 428 engages the second engagement surface 516 of the first arcuate section 526. Finally, the first engagement surface 416 of the second arcuate section 426 engages the second engagement surface 516 of the second arcuate section 528.

Additionally, the fastener 300 is shown coupled to the coupler 310. The fastener support 302 prevents the fastener 300 from moving in a downward direction with respect to the upper hinge member 204, while the coupler 310 is free to move upward and compress the spring 308 (as shown in FIG. 3). The spring 308 is always in a compressed position, but not always in the same state of compression, such that the spring 308 and the engagement surfaces, 416 and 516, are constantly biasing the hinge assembly 108 to return to or remain in the closed position.

FIG. 7 shows the hinge assembly 108 slightly opened in a first rotational direction. While in this position, the first engagement surface 416 of the second upper arcuate section 426 partially engages the second engagement surface 516 of the second lower arcuate section 528, however, a portion of the first engagement surface 416 of the second upper arcuate section 426 is not engaged with the second engagement surface 516 of the second lower arcuate section 528. Further, the first engagement surface 416 of the first and third upper arcuate sections, 424 and 428, separates from the second engagement surface 516 of the first and third arcuate sections, 526 and 530.

In the slightly opened position, the upper hinge member 204 has shifted slightly upward with respect to the lower hinge member 206. As the fastener support 302 prevents the fastener 300 from moving in the downward direction, the coupler 310 (as shown in FIG. 6) has been pulled up within the lower hinge member 206 and has further compressed the spring 308 (as shown in FIG. 3).

FIG. 8 shows the hinge assembly 108 in a more fully opened position than FIG. 7, however in a second rotational direction. While in this position, the first engagement surface 416 of the first and third upper arcuate sections, 424 and 428, each engage the second engagement surface 516 of the first and third lower arcuate sections, 526 and 530. However, a portion of the first engagement surface 416 of the first upper arcuate section 424 is not engaged with the second engagement surface 516 of the first and third upper arcuate sections, 526 and 530. Further, the first engagement surface 416 of the second upper arcuate section 426, separates from the second engagement surface 516 of the second lower arcuate section 528.

Additionally, when the hinge assembly 108 is opened in the second rotational direction, the structure of the second and third lower flat sections, 512 and 514, allow the first and second upper flat sections, 410 and 412, to pass over without making contact. The second and third lower flat sections, 512 and 514, are shown so be sloped to accommodate the first and second upper flat sections, 410 and 412, with minimal gap as the hinge assembly 108 rotates. However, the second and third lower flat sections, 512 and 514, may not slope at all or may have any number or angle of slopes such that they do not interfere with the first and second upper flat sections, 410 and 412.

In the more fully opened position, the upper hinge member 204 has shifted even further upward with respect to the lower hinge member 206 than FIG. 7. As the fastener support 302 continues to prevent the fastener 300 from moving in the downward direction, the coupler 310 (as shown in FIG. 6) has been pulled up even further within the lower hinge member 206 and has even further compressed the spring 308 (as shown in FIG. 3).

Figure 9:
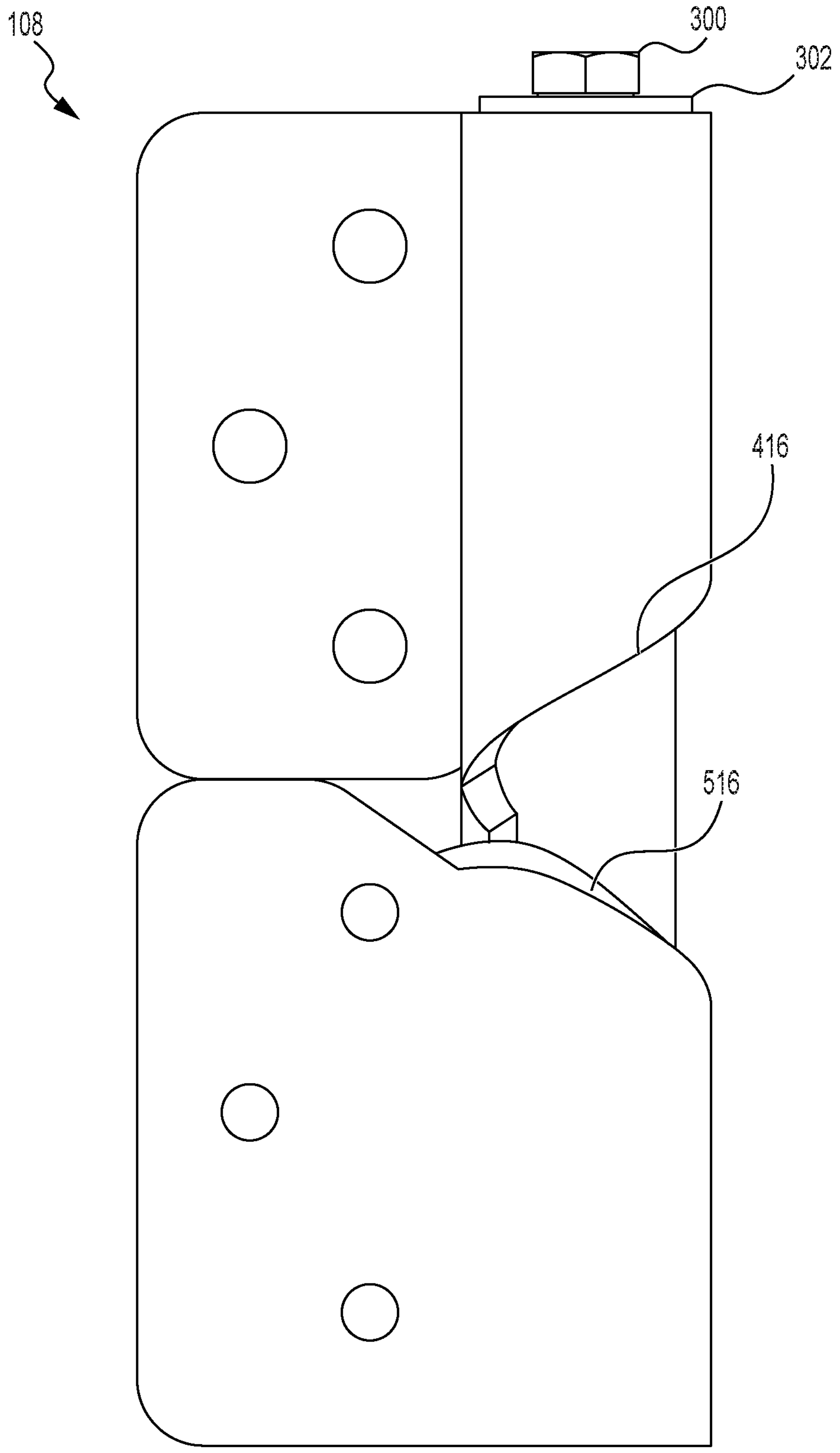
FIG. 9 is a side view of a hinge assembly in a fully open position.

FIG. 9 shows the hinge assembly 108 in a fully open position, with the second upper intersection 432 engaging the second lower intersection 534, with the remainder of the engagement surfaces, 416 and 516, separated.

In the fully opened position, the upper hinge member 204 has shifted even further upwards with respect to the lower hinge member 206 than FIG. 8. Similarly, the coupler 310 (as shown in FIG. 6) has been pulled up even further within the lower hinge member 206 and has further compressed the spring 308 (as shown in FIG. 3). The compressed spring 308 is now exerting an even further increased force on the hinge assembly 108, biasing it to return to the closed position.

INDUSTRIAL APPLICABILITY

The above disclosure is a hinge assembly 108 for rotating a gate 110 in relation to a support 106. The hinge assembly 108 includes two hinge members, 204 and 206, with sloped and pitched engagement surfaces, 416 and 516, configured to maximize contact and minimize pressure points between each other while the gate is moved between closed and opened positions. Further, the angled profile of the engagement surfaces, 416 and 516, creates a gravity-assisted closing feature, and when combined with the biasing action of the spring 306 gives the hinge assembly 108 multiple self-closing features.

Accordingly, gate 110 and support 106 setups using the hinge assembly 108 may suffer less wear which may lead to decreased issues and increased lifespan. Further, the potential reduced wear and self-closing features may reduce the potential for the gate 110 to be positioned or stuck in a partially opened configuration, such that the gate 110 interferes with a walkway 104 or leaves an edge of a walkway 104 exposed.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of the disclosure. Such embodiments should be understood to fall within the scope of the present disclosure as determined based upon the claims and any equivalents thereof.

What is claimed is:

1. A hinge arrangement allowing a gate on a construction machine to move between a closed and open position, comprising:

an upper hinge member, including:

an upper plate segment, including:

a first upper surface and a first lower surface opposite one another;

a first front surface and a first back surface opposite one another;

a first upper flat section extending from a first flat end surface to a second upper flat section; and the second upper flat section extending from the first upper flat section to a first upper arcuate section, the portion of the first lower surface of the second upper flat section sloping towards the first upper surface; and an upper barrel segment connected to the upper plate segment, including:

a first top surface and a first engagement surface opposite one another;

a first inner surface and a first outer surface opposite one another;

the first upper arcuate section extending from the second upper flat section to a second upper arcuate section, the portion of the first engagement surface of the first upper arcuate section sloping towards the first upper surface and pitching towards the first inner surface;

the second upper arcuate section extending from the first upper arcuate section to a third upper arcuate section, the portion of the first engagement surface of the second upper arcuate section sloping away from the first upper surface and pitching towards the first inner surface; and the third upper arcuate section extending from the second upper arcuate section to a first arcuate end surface, the portion of the first engagement surface of the third upper arcuate section sloping towards the first upper surface and pitching towards the first inner surface; and a lower hinge member, including:

a lower plate segment, including:

a second upper surface and a second lower surface opposite one another;

a second front surface and a second back surface opposite one another;

a first lower flat section extending from a second flat end surface to a second lower flat section; and the second lower flat section extending from the first lower flat section to a first lower arcuate section, the portion of the second upper surface of the second lower flat section sloping towards the second lower surface;

a lower barrel segment connected to the lower plate segment, including:

a second engagement surface and a second bottom surface opposite one another;

a second inner surface and a second outer surface opposite one another;

the first lower arcuate section extending from the second lower flat section to a second lower arcuate section, the portion of the second engagement surface of the first lower arcuate section sloping towards the second lower surface and pitching towards the second outer surface;

the second lower arcuate section extending from the first lower arcuate section to a third lower arcuate section, the portion of the second engagement surface of the second lower arcuate section sloping away from the second lower surface and pitching towards the second outer surface; and the third lower arcuate section extending from the second lower arcuate section to a second arcuate end surface, the portion of the second engagement surface of the third lower arcuate section sloping towards the second lower surface and pitching towards the second outer surface, and a fastener pivotally holding the upper hinge member and lower hinge member.

2. The hinge arrangement of claim 1, wherein when the intersection of the first upper arcuate section and the second upper arcuate section is in contact with the intersection of the second lower arcuate section and the third lower arcuate section, the hinge arrangement is in a closed position.

3. The hinge arrangement of claim 2, wherein when the intersection of the second upper arcuate section and the third upper arcuate section is in contact with the intersection of the second lower arcuate section and the third lower arcuate section, the hinge arrangement is in a fully open position.

4. The hinge arrangement of claim 3, wherein while in the closed position:

the portion of the first engagement surface of the first arcuate section engages the portion of the second engagement surface of the first and third arcuate sections;

the portion of the first engagement surface of the third arcuate section engages the portion of the second engagement surface of the first arcuate section; and the portion of the second engagement surface of the second arcuate section engages the portion of the first engagement surface of the second arcuate section.

5. The hinge arrangement of claim 4, wherein while moving between the closed position and the fully open position:

the portion of the first engagement surface of the first and third arcuate sections each engage the portion of the second engagement surface of the first and third arcuate sections; or the portion of the first engagement surface of the second upper arcuate section engages the portion of the second engagement surface of the second lower arcuate section.

6. The hinge arrangement of claim 5, wherein while moving from the closed position to the open position, a portion of the first engagement surface is not engaged with a portion of the second engagement surface.

7. The hinge arrangement of claim 6, wherein while moving from the closed position to the open position, either:

the portion of the first engagement surface of the first and third arcuate sections separates from the portion of the second engagement surface of the first and third arcuate sections; or the portion of the first engagement surface of the second upper arcuate section separates from the portion of the second engagement surface of the second lower arcuate section.

8. The hinge arrangement of claim 7, wherein:

the first engagement surface slopes upwards and downwards at an angle between 20 and 70 degrees;

the first engagement surface pitches inwards at an angle between 20 and 45 degrees;

the second engagement surface slopes upwards and downwards at an angle between 20 and 70 degrees; and the second engagement surface pitches outwards at an angle between 20 and 45 degrees.

9. The hinge arrangement of claim 8, wherein the angles upwards and downwards are the same, and wherein the angles inwards and outwards are the same.

10. A gate assembly for a construction machine, comprising:

a support member;

a gate;

a hinge assembly connecting the support member to the gate, including:

an upper hinge member, including:

an upper plate segment, including:

a first end, the first end connected to one of the support member or gate;

a first upper surface and a first lower surface opposite one another;

a first front surface and a first back surface opposite one another;

a first upper flat section extending from a first flat end surface to a second upper flat section; and the second upper flat section extending from the first upper flat section to a first upper arcuate section, the portion of the first lower surface of the second upper flat section sloping towards the first upper surface; and an upper barrel segment connected to the upper plate segment, including:

a first top surface and a first bottom surface opposite one another;

a first inner surface and a first outer surface opposite one another;

the first upper arcuate section extending from the second upper flat section to a second upper arcuate section, the portion of the first bottom surface of the first upper arcuate section sloping towards the first upper surface and pitching towards the first inner surface;

the second upper arcuate section extending from the first upper arcuate section to a third upper arcuate section, the portion of the first bottom surface of the second upper arcuate section sloping away from the first upper surface and pitching towards the first inner surface; and the third upper arcuate section extending from the second upper arcuate section to a first arcuate end surface, the portion of the first bottom surface of the third upper arcuate section sloping towards the first upper surface and pitching towards the first inner surface; and a lower hinge member, including:

a lower plate flat segment, including:

a second end, the second end connected to the other of the support member or gate;

a second upper surface and a second lower surface opposite one another, the second upper surface configured to engage the first lower surface;

a second front surface and a second back surface opposite one another;

a first lower flat section extending from a second flat end surface to a second lower flat section; and the second lower flat section extending from the first lower flat section to a first lower arcuate section, the portion of the second upper surface of the second lower flat section sloping towards the second lower surface; and a lower barrel segment connected to the lower plate segment, including:

a second top surface and a second bottom surface opposite one another;

a second inner surface and a second outer surface opposite one another;

the first lower arcuate section extending from the second lower flat section to a second lower arcuate section, the portion of the second bottom surface of the first lower arcuate section sloping towards the second lower surface and pitching towards the second outer surface;

the second lower arcuate section extending from the first lower arcuate section to a third lower arcuate section, the portion of the second upper surface of the second lower arcuate section sloping away from the second lower surface and pitching towards the second outer surface; and the third lower arcuate section extending from the second lower arcuate section to a second arcuate end surface, the portion of the second upper surface of the third lower arcuate section sloping towards the second lower surface and pitching towards the second outer surface; and a fastener pivotally holding the upper hinge member and lower hinge member.

11. The gate assembly of claim 10, wherein when the intersection of the first upper arcuate section and the second upper arcuate section is in contact with the intersection of the second lower arcuate section and the third lower arcuate section, the hinge arrangement is in a closed position.

12. The gate assembly of claim 11, wherein when the intersection of the second upper arcuate section and the third upper arcuate section is in contact with the intersection of the second lower arcuate section and the third lower arcuate section, the hinge arrangement is in a fully open position.

13. The gate assembly of claim 12, wherein while in the closed position:

the portion of the first bottom surface of the first arcuate section engages the portion of the second upper surface of the first and third arcuate sections;

the portion of the first bottom surface of the third arcuate section engages the portion of the second upper surface of the first arcuate section; and the portion of the second top surface of the second arcuate section engages the portion of the first lower surface of the second arcuate section.

14. The gate assembly of claim 13, wherein while moving between the closed position and the fully open position:

the portion of the first bottom surface of the first and third arcuate sections each engage the portion of the second upper surface of the first and third arcuate sections; or the portion of the first bottom surface of the second upper arcuate section engages the portion of the second upper surface of the second lower arcuate section.

15. The gate assembly of claim 14, wherein while moving from the closed position to the open position, a portion of the first bottom surface is not engaged with a portion of the second upper surface.

16. The gate assembly of claim 15, wherein while moving from the closed position to the open position, either:

the portion of the first bottom surface of the first and third arcuate sections separates from the portion of the second upper surface of the first and third arcuate sections; or the portion of the first bottom surface of the second upper arcuate section separates from the portion of the second upper surface of the second lower arcuate section.

17. The gate assembly of claim 16, wherein:

the first bottom surface slopes upwards and downwards at an angle between 30 and 50 degrees;

the first bottom surface pitches inwards at an angle between 24 and 36 degrees;

the second upper surface slopes upwards and downwards at an angle between 30 and 50 degrees; and the second upper surface pitches outwards at an angle between 24 and 36 degrees.

18. The gate assembly of claim 17, wherein the angles upwards and downwards are the same, and wherein the angles inwards and outwards are the same.

19. The gate assembly of claim 18, wherein the first bottom surface and second bottom surface are hardened by undergoing nitriding.

20. A hinge arrangement, comprising:

an upper hinge member, including:

an upper plate segment, including:

a first upper surface and a first lower surface opposite one another;

a first front surface and a first back surface opposite one another;

a first upper flat section extending from a first flat end surface to a second upper flat section; and the second upper flat section extending from the first upper flat section to a first upper arcuate section, the portion of the first lower surface of the second upper flat section sloping towards the first upper surface; and an upper barrel segment connected to the upper plate segment, including:

a first top surface and a first bottom surface opposite one another;

a first inner surface and a first outer surface opposite one another;

the first upper arcuate section extending from the second upper flat section to a second upper arcuate section, the portion of the first bottom surface of the first upper arcuate section sloping towards the first upper surface at an angle between 38-42 degrees, and pitching towards the inner surface at an angle between 28-32 degrees;

the second upper arcuate section extending from the first upper arcuate section to a third upper arcuate section, the portion of the first bottom surface of the second upper arcuate section sloping away from the first upper surface at an angle between 38-42 degrees and pitching towards the inner surface at an angle between 28-32 degrees; and the third upper arcuate section extending from the second upper arcuate section to a first arcuate end surface, the portion of the first bottom surface of the third upper arcuate section sloping towards the first upper surface at an angle between 38-42 degrees and pitching towards the inner surface at an angle between 28-32 degrees; and a lower hinge member, including:

a lower plate segment, including:

a second upper surface and a second lower surface opposite one another, the second upper surface configured to engage the first lower surface;

a second front surface and a second back surface opposite one another;

a first lower flat section extending from a second flat end surface to a second lower flat section;

the second lower flat section extending from the first lower flat section to a third lower flat section, the portion of the second upper surface of the second lower flat section sloping towards the second lower surface; and the third lower flat section extending from the second lower flat section to a first lower arcuate section, the portion of the second upper surface of the third flat section sloping away from the second lower surface; and a lower barrel segment connected to the lower plate segment, including:

a second top surface and a second bottom surface opposite one another;

a second inner surface and a second outer surface opposite one another;

the first lower arcuate section extending from a third lower flat section to a second lower arcuate section, the portion of the second bottom surface of the first lower arcuate section sloping towards the second lower surface at an angle between 38-42 degrees and pitching towards the second outer surface at an angle between 28-32 degrees;

the second lower arcuate section extending from the first lower arcuate section to a third lower arcuate section, the portion of the second upper surface of the second lower arcuate section sloping away from the second lower surface at an angle between 38-42 degrees and pitching towards the second outer surface at an angle between 28-32 degrees; and the third lower arcuate section extending from the second lower arcuate section to a second arcuate end surface, the portion of the second upper surface of the third lower arcuate section sloping towards the second lower surface at an angle between 38-42 degrees and pitching towards the second outer surface at an angle between 28-32 degrees, wherein when the intersection of the first upper arcuate section and the second upper arcuate section is in contact with the intersection of the second lower arcuate section and the third lower arcuate section, the hinge arrangement is in a closed position, and when the intersection of the second upper arcuate section and the third upper arcuate section is in contact with the intersection of the second lower arcuate section and the third lower arcuate section, the hinge arrangement is in a fully open position, and wherein while moving between the closed position and the fully open position, either the portion of the first bottom surface of the first and third arcuate sections each engage the portion of the second upper surface of the first and third arcuate sections, or the portion of the first bottom surface of the second upper arcuate section engages the portion of the second upper surface of the second lower arcuate section, the other sections separating from one another; and a fastener pivotally holding the upper hinge member and lower hinge member.

* * * * *